United States Patent [19]

Nishimura et al.

[11] 4,396,941
[45] Aug. 2, 1983

[54] COMBINED TELEVISION RECEIVER/TAPE RECORDER/CALCULATOR

[75] Inventors: Kosuke Nishimura, Yamatokoriyama; Hirohide Nakagawa, Sakurai; Isamu Haneda, Yamatokoriyama, all of Japan

[73] Assignee: Sharp Kabushiki Kaisha, Osaka, Japan

[21] Appl. No.: 270,880

[22] Filed: Jun. 5, 1981

Related U.S. Application Data

[63] Continuation of Ser. No. 37,032, May 8, 1979.

[30] Foreign Application Priority Data

May 15, 1978 [JP] Japan .................................. 53-57833

[51] Int. Cl.³ ........................ H04N 7/00; H04N 5/64; G06F 3/14
[52] U.S. Cl. ...................................... 358/93; 358/189; 358/254; 358/903; 364/705; 369/7; 369/10; 455/344; 455/347
[58] Field of Search ................. 358/93, 188, 189, 254, 358/903, 305; 364/705; 369/7, 10; 455/344, 347

[56] References Cited

U.S. PATENT DOCUMENTS

| | | | |
|---|---|---|---|
| 2,983,795 | 5/1961 | Tateishi | 369/7 |
| 3,824,472 | 7/1974 | Engel | 369/10 |
| 3,896,267 | 7/1975 | Sachs | 179/2 TU |
| 3,909,818 | 9/1975 | Dalke | 364/515 |
| 4,120,037 | 10/1978 | Sato | 364/705 |
| 4,236,152 | 11/1980 | Masuzawa | 364/705 |

FOREIGN PATENT DOCUMENTS 55-51395  4/1980  Japan ...................................... 369/7

OTHER PUBLICATIONS

Microkit Incorporated Brochure, (1976).

*Primary Examiner*—Howard Britton
*Attorney, Agent, or Firm*—Birch, Stewart, Kolasch & Birch

[57] ABSTRACT

A new and useful combination of a radio receiver, a television receiver, a tape recorder and an electronic calculator is described. A display (for example, a cathode ray tube) of the television receiver is connected to serve also as a display for the electronic calculator. Data may be introduced into the calculator via the tape recorder and recorded into the tape recorder. The television receiver serves a display and the tape recorder serves as an external storage, with respect to the calculator.

7 Claims, 6 Drawing Figures

COMBINED TELEVISION RECEIVER/TAPE RECORDER/CALCULATOR

This application is a continuation, of copending application Ser. No. 37,032, filed on May 8, 1979.

BACKGROUND OF THE INVENTION

This invention relates to a combination of a television receiver, a radio receiver, a tape recorder and an electronic calculator.

As fully disclosed in our copending application Ser. No. 959,603 on Nov. 9, 1978 "READOUT MEANS OF A CALCULATOR OPERATIVELY ASSOCIATED WITH A HOME USE TV IMAGE SCREEN", now U.S. Pat. No. 4,236,152 a combination of a television receiver and an electronic calculator has been suggested to display operational results on an image screen of the television receiver. While it is possible to display versatile types of information on the television screen, the calculator itself is not expected to expand its functions.

SUMMARY OF THE INVENTION

With the foregoing in mind, it is an object of the present invention to provide a new and useful combination of a radio receiver, a television receiver, a tape recorder and an electronic calculator. According to the teachings of the present invention, a display (for example, a cathode ray tube) of the television receiver also serves as a display for the electronic calculator. Data may be introduced into the calculator via the tape recorder and recorded into the tape recorder.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
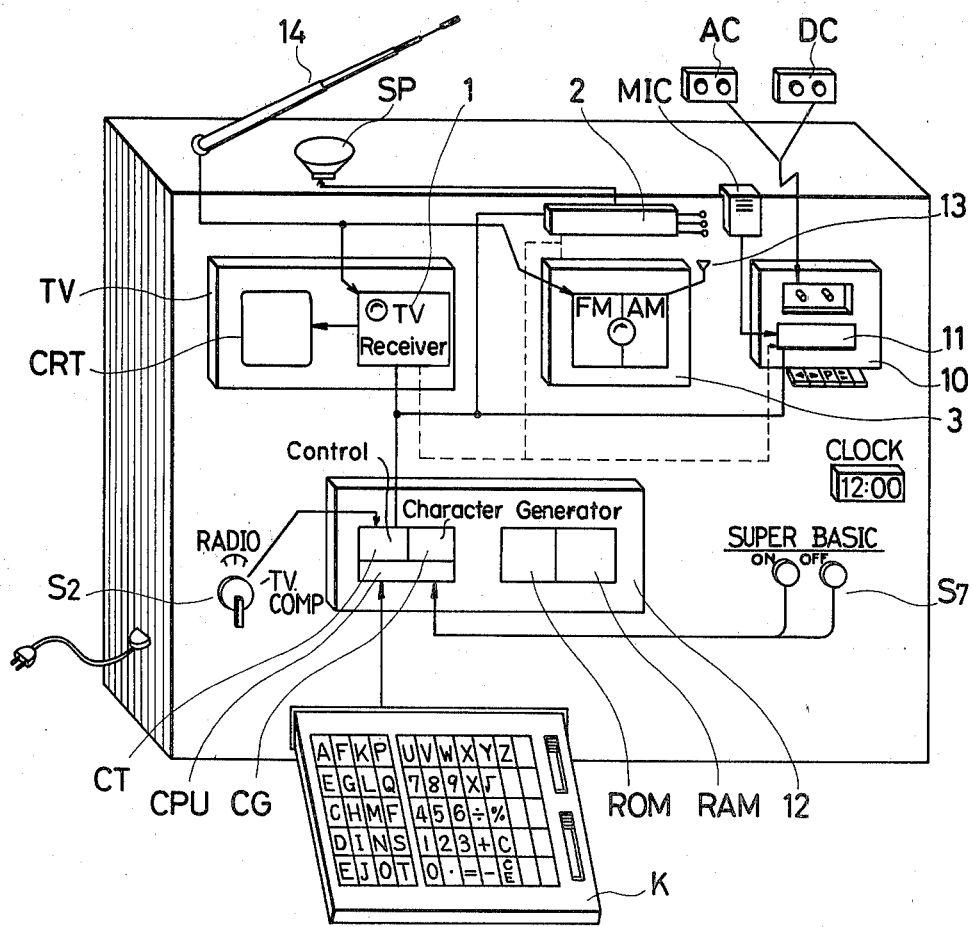
FIG. 1 is a perspective view of one preferred embodiment of the present invention.

Referring now to FIG. 1, there is illustrated one preferred embodiment of the present invention. A television receiver TV comprises a cathode ray display tube CRT, and receiver circuitry 1 consisting of a video amplifier, an intermediate frequency amplifier, a detector, etc., as is well known in the art. A radio receiver is labeled 3 and a record/playback circuit 11 is operative to record audio signals from a microphone MIC, the television receiver circuitry 1 and the radio receiver 3 onto a tape or record data signals outputted from an electronic calculator 12 thereon. The record/playback circuitry 11 aids in reproducing a record on the tape and particularly sends audio signals to a low frequency amplifier 2 and the data signals to the low frequency amplifier 2 and the calculator 12. An audio tape AC is a tape for recording musics and sounds and a data tape DC is for storing programs, operational results, etc. in connection with the calculator. Both tapes AC, DC are of the cassette type and are subject to recording and playback in substantially the same manner. A control CT is linked to the cathode ray tube CRT. A character generator CG converts the output of the CT into video signals. A read only memory ROM and a random access memory RAM are further provided. A central processing unit CPU executes arithmetic operations as input signals keyed via a keyboard K pursuant to instructions contained within the ROM and RAM. The output of the CPU is supplied to the control CT for displaying desired characters, charts or the like on the CRT. In the case where digital information is desired to be recorded on or reproduced from the data cassette tape DC, the data signals are sent to or retrieved from the calculator 12 via the record/playback circuitry 11.

A mode selector switch $S_2$ in a RADIO mode renders the radio receiver operative and the same in a TV-COMP mode renders the television receiver operative as long as a power switch $S_7$ of the calculator is in an OFF position and renders the calculator operative so that operational results, programs, etc. are displayed on the CRT as long as the power switch $S_7$ is in an ON position. When the power switch $S_7$ is ON, the television image is erased no matter what channel the operator selects. The CRT is therefore used as a display of the calculator.

When the power switch $S_7$ is in the ON state and the mode selector switch $S_2$ is switched to the RADIO mode, a display on the CRT disappears and the radio receiver is enabled to receive broadcasting waves but no changes in operational stage of the calculator are viewed because the calculator power switch is in the ON state. As long as the calculator is executing arithmetic operations, it continues executing the operations. In the case where the mode selector switch $S_2$ is switched after the completion of arithemtic operations, the previous operation results remain unchanged and stored in the calculator.

Upon actuation of keys on the keyboard K, the CPU senses the key actuation and sends its output to the low frequency amplifier 2, thus enabling a loud speaker SP to release a warning signal indicative of the key actuation.

An antenna for the television receiver TV and the radio receiver 3 is labeled 14 and a clock is labeled CLOCK.

Figure 2:
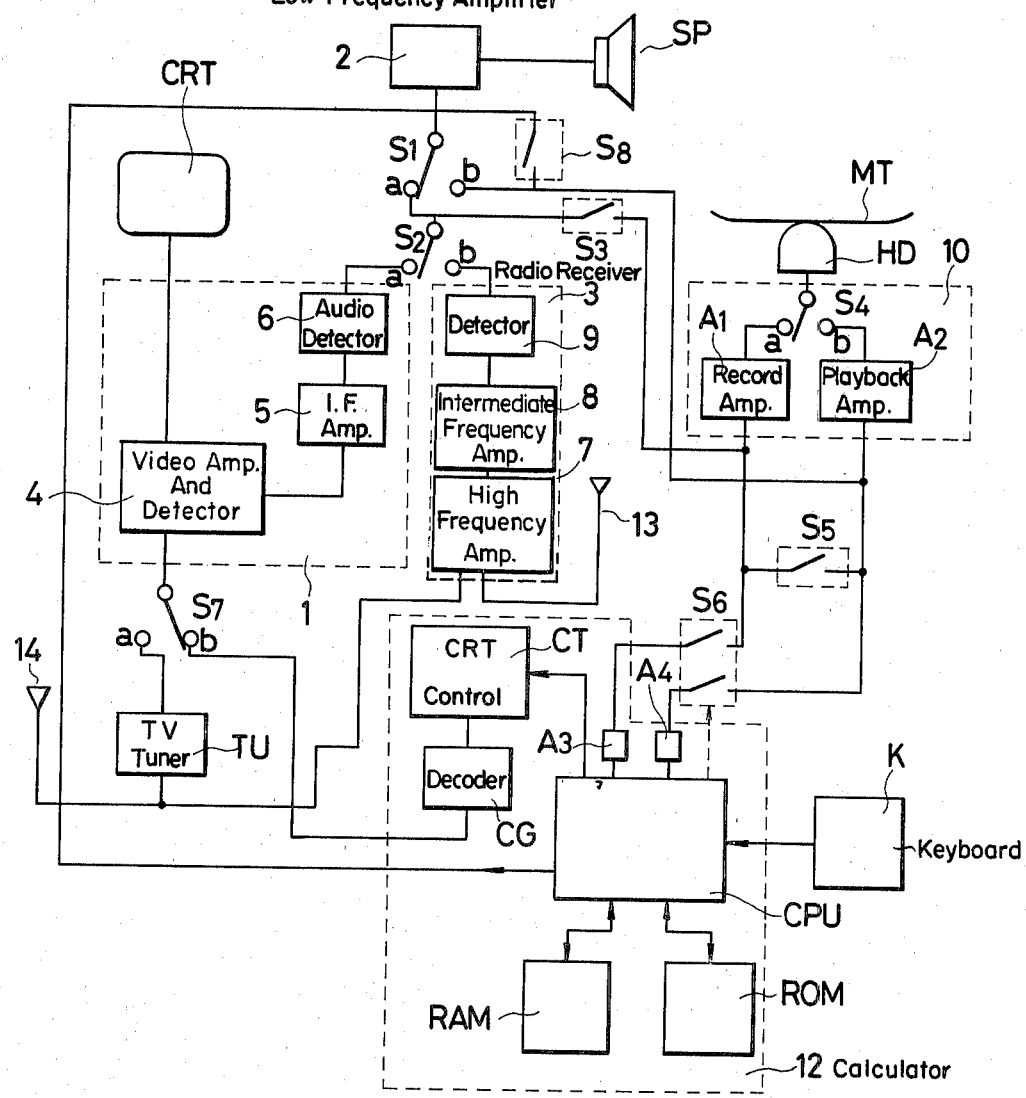
FIG. 2 is a detailed diagram of the embodiment of FIG. 1.

FIG. 2 is a more detailed diagram of FIG. 1 wherein similar components are given the same reference number as in FIG. 1.

The above described receiver circuitry 1 comprises a video amplifier and detector 4, an audio intermediate frequency amplifier 5 and an audio detector 6, the last providing television sound signals. The amplifier and detector 4 provides video signals for display on the CRT. A television tuner TU provides video intermediate frequency signals.

The radio receiver circuitry 3 comprises a high frequency amplifier 7, an intermediate frequency amplifier 8 and a detector 9 which provides radio audio signals.

As is well known in the art, the tape recorder 10 comprises a magnetic tape MT, a record and playback head HD, a record amplifier $A_1$ and a playback amplifier $A_2$. A record and playback selection switch $S_4$ is operatively associated with the switch $S_1$ and turned to a side "b" when in the playback mode and a side "a" in the record mode.

Figure 3:
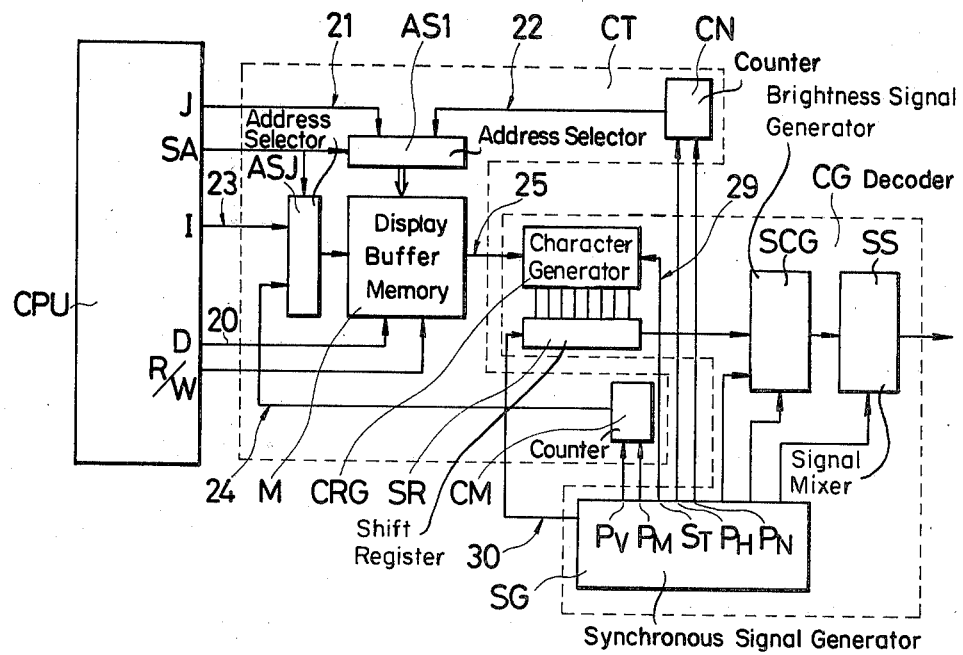
FIG. 3 is a schematic diagram of a portion of the embodiment of FIG. 1.

The calculator 12 comprises the CRT control CT, a memory (random access memory) corresponding the screen of the CRT and a circuit for reading out the contents of the memory in synchronism with a raster scan of the CRT. A decoder CG decodes character code signals from the control CT. As shown in FIG. 3, the calculator 12 further comprises a brightness signal generator SCG and a synchronous signal generator SG. The character code signals from the control CT are decoded in sequence and converted into the video signals via the brightness signal generator SCG, the synchronous signal generator SG, etc.

The CRT control CT and the character generator CG in FIG. 2 will now be described by reference to FIG. 3.

A display buffer memory M is addressed by address selectors AS1 and ASJ. Upon the development of a write signal from the CPU data are written a working area of the memory addressed by the selectors. The data to be written are sent from the CPU via a data bus 20. Address lines 21, 22 are provided for the columns of the memory M and an address select signal SA indicates AS1, to determine whether to select the line 21 or the line 22.

Address lines 23, 24 are provided for the lines of the memory and ASJ determines according to the address select signal SA whether the line 23 or the line 24 should be selected.

Figure 4:
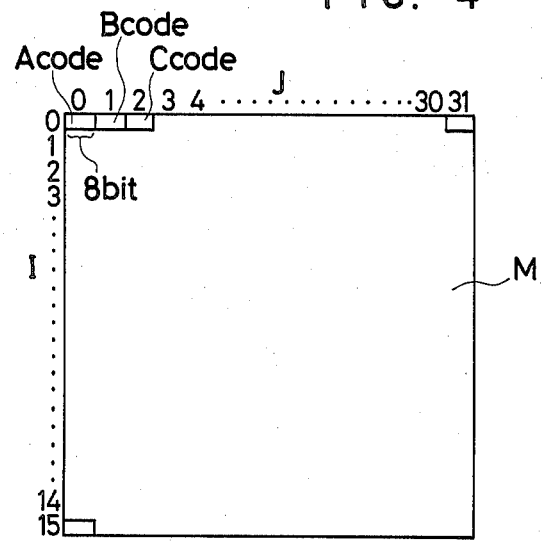
FIGS. 4 through 6 are explanatory diagrams for illustrating operation of the embodiment of FIG. 1.
Figures 5, 6:
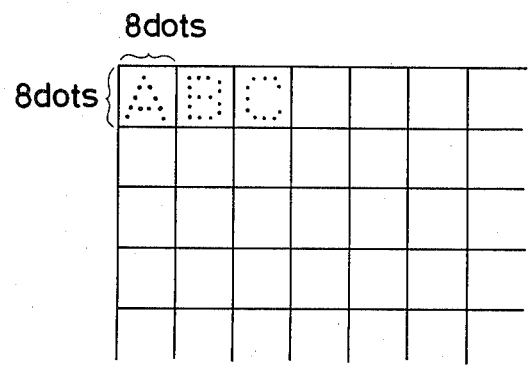

Assume now that the memory M stores data corresponding the overall image screen of the CRT. Each character (including symbols and numerals) includes 8 bits. The address where each character code is stored corresponds to each displaying position on the television screen. The data stored within the memory in FIG. 4 are displayed on the television receiver as viewed from FIG. 6. Each character is displayed in an 8×8 bit matrix as shown in FIG. 5.

The data written within the memory M are transferred into the character generator CRG in synchronism with the raster scan operation on the television receiver. An output line 25 leading from the memory M enables the contents of the working area addressed to be read out even when a readout signal is not developed from the CPU.

Counters CN, CM are adapted to address the columns and lines of the memory M, the former CN being a X32 counter receiving a train of horizontal division pulses PN and a train of horizontal synchronous pulses PH and being incremented by the pulses PN and reset to its initial state by the pulse PH and the latter CM responsive to a train of vertical synchronous signals PV and a train of vertical division pulses PM and being reset to "0" each time PV is applied and incremented each time PM is applied thereto.

With such an arrangement, the memory M is addressed sequentially by the counters CN, CM and the data are transferred from the thus addressed memory area to the CRG. The data contained within the CRG are decoded according to a signal ST and shifted into a shift register SR.

The above described circuit construction will operate in the following manner as indicated in FIGS. 3 through 5.

The contents CN, CM specify the address IJ=0, 0 of the memory M, codes of the contents "A" at that address being transferred into the CRG of FIG. 3. Simultaneously, the data at the extreme upper line of a full character are sent to the CRG via the line 29. In this case "00111000" at the extreme upper line is shifted from the character generator CRG to the shift register SR. Subsequently, SG enables SR to be serially shifted via a shift register control line, the output of the SR being conveyed to the SCG. The outputs of the counters indicate that the address I, J=0, 1 in FIG. 4. That address stores codes "B" and the CRG sends the extreme upper data of the character codes "B" to the SR. The same procedure is repeated so that I, J=0, 31 and the character codes at that address are transferred into CRG and the data at the extreme upper line thereof are transferred into SR. SR provides serially its output to SCR under the control of SG. In this way, the extreme upper line of the character is displayed on the television screen.

Thereafter, the counters CN, CM indicate that I, J within the memory of FIG. 4 are 0, 0, thus providing codes "A" and sending the data at the second highest line of the full character to CRG via the line 29. Therefore, CRG transmits the second line data "01000100" into SR. When the shift register SR receives data, SR provides serially the data in response to a shift control signal from SG.

The counter specifies that I, J=0, 1 and the codes "B" are transferred into CRG which in turn sends the second line data of the character "B" to SR. As a result, the second line of the character is displayed on the television screen.

After 128 lines are displayed in the above described manner, the CRT control specifies that I, J=0, 0 with respect to the memory M. A full width image is displayed while the memory is sequentially addressed in synchronism with the raster scan operation of the television receiver. A signal mixer is labeled SS, which receives video signals necessary for signal mixture, for example, the horizontal synchronous signals, the vertical synchronous signals, synchronous signal equalizing pulses, burst signals from SC.

Returning now to FIG. 2, the switch $S_7$ selects either the video signals from CG or the television video signals from TU and is operatively associated with the power switch of the calculator 12. $S_7$ in the ON position in FIG. 1 corresponds to $S_7$ at the side "b" in FIG. 2. When the calculator power switch is turned ON, the television tuner is electrically cut off so that the television video circuitry 1 is connected to CG in the calculator 12 and CRT is available as a display of the calculator whatever channel is selected.

CPU executes arithemetic operations according to instructions and data contained within ROM and RAM in response to the key input signals from the keyboard K and the character codes to be displayed on CRT are written into an addressed area of the memory. CPU senses actuations of the respective keys on the keyboard K and sends the key detection signal to the low frequency amplifier 2.

A record interface $A_3$ is provided for the tape recorder for modulating and converting binary signals from CPU into audible frequency signals. If $S_6$ is in the ON position and the tape recorder is in the record mode, then the modulated binary signals will be recorded on the magnetic tape MT.

A reproduction interface $A_4$ is adapted to convert the modulated binary signals into binary "H" and "L" signals.

Thanks to those functions it is possible to record the programs introduced via the keyboard and the operational results, etc. and also transmit these records into CPU.

The low frequency amplifier 2 receives the audio signals from the television receiver, the radio receiver or the tape recorder, the reproduction signals transmitted from the tape recorder to the data cassette tape and the data signals transmitted from the calculator into the tape recorder, thus enabling the loud speaker SP to release audible sounds.

The record/playback switch $S_1$ of the tape recorder is operatively associated with $S_4$ and, when the tape recorder is in the playback mode, $S_1$ and $S_4$ are both on the side "b". Otherwide, $S_1$ and $S_4$ are on the side "a", for example, in the record mode or not in use.

A television/radio switch $S_2$ is operatively associated with the mode selector switch $S_2$ of FIG. 1 and selects audio signals between from the television and from the radio receiver, when the switch $S_2$ is turned to the side "a" and the side "b", respectively.

$S_7$ corresponds to $S_7$ of FIG. 1 and is turned to the side "b" and the side "a" when the calculator power is ON and OFF, respectively.

$S_6$ is turned ON when the modulated binary data are transmitted between CPU and the tape recorder and controlled ON and OFF by CPU.

Switches $S_3$, $S_5$ and $S_8$ are also controlled by CPU. When the binary data are to be recorded on the data cassette tape, $S_3$ is OFF and $S_5$ and $S_8$ are both ON. Otherwise, $S_3$ is ON and $S_5$ and $S_8$ are OFF.

When the calculator power supply is OFF, namely, $S_7$ is on the side "a" and the mode selector switch $S_2$ is on the television side "a", the video intermediate frequency signals from TU are developed at the receiver video circuitry 1 so that a television image is displayed on CRT and audio signals are released form SP.

If the mode selector switch $S_2$ is turned to the radio side "b", audio signals are developed from the radio receiver 3 and then SP.

If it is desired to place the tape recorder to the playback mode, $S_1$ and $S_4$ are turned to the side "b" and the signals from the reproduction amplifier $A_2$ are developed at 2 to enable the speaker SP to release tape recorder audio signals. If a music is recorded under these circumstances, that music is made audible.

In the case where sounds from the radio receiver are recorded, the mode selector switch $S_2$ is turned to the side "b" to place the tape recorder and render the record amplifier A operative. Since the calculator power supply is OFF in this case, $S_3$ is in the ON position and the tape recorder is ready to record sounds signals from the radio receiver.

When the calculator power supply is turned ON, $S_7$ is inclined to the side "b" and CRT displays operational results or the like from the calculator. If $S_2$ is inclined to the side "b", audio signals from the radio receiver 3 are conveyed to 2 to enable the speaker SP to release radio sounds. Therefore, the calculator and the radio receiver are available at the same time. The tape recorder is also available at the same time. It is possible to operate the calculator while the operator enjoys listening the radio receiver. This is the case where it takes a considerable amount of time to complete an arithmetic operation.

When the calculator learns the program stored on the data cassette tape, $S_6$ is turned ON to urge CPU into the program learn mode in response to actuations of the keys on the keyboard K. Under the circumstance the signals are reproduced from the data cassette tape and transmitted into 2, enabling SP to release audible sounds. The binary data are reproduced in the form of intermittent sounds "peep peep", indicating that at least a program is being introduced into the calculator.

The reproduction interface $A_4$ converts the reproduced signals into the binary level signals "H" and "L" intelligible to CPU and CPU introduces the program into RAM. Simultaneously, the program is displayed sequentially on CRT.

When it is desired to record the program introduced via the keyboard K onto the data cassette tape, CPU is pushed into the program learn state in response to actuation of a specific key, so that the program introduced upon subsequent actuations of the keys in written into RAM. The program stored within RAM is recorded since CPU turns $S_6$ ON. The program is developed at the record interface $A_3$. Therefore, after the tape recorder is placed into the record mode, actuations of specific keys enables the program to be stored onto the tape. Since $S_3$ is OFF and $S_5$ and $S_8$ are ON in this case, the modulated binary signals from $A_3$ are outputted to 2 via $S_5$ and $S_8$. The signals from the record amplifier circuit $A_1$ are released vis SP, indicated that the program is recorded on the tape. When the mode selector switch $S_2$ in turned to the radio side "b", the switch $S_3$ prevents radio sound signals $S_3$ prevents radio sound signals from being developed at $A_1$ abd overlapped with the program signlas at $A_3$.

The reproduction interface $A_4$ converts the modulated binary data rather than analog signals such as musical sounds and voices into the corresponding binary codes. CPU receives no information at this time. As long as a program message word such as "next program for calculating the area of a polygon" is recorded in the form of audible voices, the operator may identify audibly the tape in loading the program on the tape into the calculator without any misunderstanding with different tapes.

As stated above, the present invention provides a combination of at least the television receiver, the tape recorder and the electronic calculator, the display of the television receiver also provides a visual display of operational results, keyed inputs of the calculator. The tape recorder serves as an external storage for the calculator. It the calculator power supply is turned ON and OFF irrespective of operation of the mode selector switch, then it becomes possible to operate the calculator, the radio receiver and the television receiver at the same time. Although in the above illustrated embodiment the mode selection is labeled only RADIO and TV-COMP, TV may be separate from COMP, thus making the television receiver available while the calculator is executing arithmetic operations. It is obvious that the television receiver, the radio receiver, the tape recorder and the calculator may be received within their unique casings, although the embodiment shows the common casing therefor.

Whereas the present invention has been described with respect to a specific embodiment, it will be understood that various changes and modifications will be suggested to one skilled in the art, and it is intended to encompass such changes and modifications as fall within the scope of the appended claims.

We claim:

1. An entertainment combination including a television receiver, a tape recorder and an electronic calculator, said combination comprising:

means for operating said television receiver as a display of said electronic calculator;

means for operating said tape recorder as an external storage for said electronic calculator;

input switch means for activating said electronic calculator and means for introducing selectively output information from said calculator and from said recorder into said television receiver for display on a television screen;

a radio receiver; and means for generating audible sounds, said sound generation means being operatively associated with said television receiver, said radio receiver and said tape recorder;

said tape recorder including means for recording and reproducing digital information and means for supplying the digital information to said sound generation means when said tape recorder is in a record or playback mode.

2. A combination according to claim 1 further comprising means for operating said tape recorder while the calculator is being used.

3. A combined television receiver, tape recorder, radio receiver and calculator, comprising:

an ON/OFF switch for the calculator;

a television selection switch; and means for correlating the calculator ON/OFF switch and the television selection switch such that an image is selectively displayed on a screen of said television receiver from said calculator or said television receiver;

said television receiver being used as a display for said calculator when said television selection switch is in the television/calculator mode and a calculator mode switch is ON no matter which channel the television tuner is set at.

4. A combined television receiver, tape recorder, radio receiver and calculator according to claim 3 further comprising a mode selection switch selectable between a radio mode and a television/calculator mode.

5. A combined television receiver, tape recorder, radio receiver and calculator according to claim 3, wherein data is indicated in the form of audible sounds when loading said tape recorder or said calculator with data.

6. A combined television receiver, tape recorder, radio receiver and calculator according to claim 3 wherein said television receiver, tape recorder, radio receiver and calculators are disposed within a common housing.

7. An entertainment combination comprising:

a television receiver;

a tape recorder;

an electronic calculator;

means for operating said television receiver as a display of said electronic calculator;

means for operating said tape recorder as an external storage for said electronic calculator;

input switch means for activating said electronic calculator and means for introducing selectively output information from said calculator and from said recorder into said television receiver for display on a television screen; and having an antenna; and means for generating audible sounds, said sound generation means being operatively associated with said television receiver, said radio receiver and said tape recorder;

said tape recorder including means for recording and reproducing digital information and means for supplying the digital information to said sound generation means when said tape recorder is in a record or playback mode;

said means for generating audible sounds including an audio amplifier and speaker.

* * * * *